United States Patent [19]

Scahill

[11] Patent Number: 4,711,470
[45] Date of Patent: Dec. 8, 1987

[54] UTILITY CONNECTION BAR

[76] Inventor: Steven Scahill, 4347 Grace Ct., Rohnert Park, Calif. 94928

[21] Appl. No.: 34,551

[22] Filed: Apr. 6, 1987

[51] Int. Cl.$^4$ .............................................. F16L 35/00
[52] U.S. Cl. ......................................... 285/30; 138/91; 138/95
[58] Field of Search ...................... 285/30; 138/89, 91, 138/95, 96 T

[56] References Cited

U.S. PATENT DOCUMENTS

| 1,838,778 | 12/1931 | McKee | 285/30 |
|---|---|---|---|
| 1,890,540 | 12/1932 | Hawkins | 285/30 |
| 2,476,120 | 7/1949 | Smith | 285/30 |

Primary Examiner—Richard J. Scanlan, Jr.
Attorney, Agent, or Firm—Flehr, Hohbach, Test, Albritton & Herbert

[57] ABSTRACT

A utility connection bar (30) dimensioned to extend between a gas supply line (42) and a customer gas line (44) of a conventional gas connection (41) is formed of molded plastic and has a bar (36) extending between threaded ends (32) and (34). The plastic bar (36) and the ends (32) and (34) have a plurality of channels (38) which extend the length of the connection bar. A pair of ¼ inch diameter holes (40) extend through the plastic bar (36) near the threaded ends (32) and (34). The combination of the channels (38) and the holes (40) makes it very difficult to form a gas flow path between the threaded ends (32) and (34) without altering the external appearance of the connection bar (30). In a utility connection bar (70), channels (86, 92) extend vertically between bottom (88) and top (90) of plastic bar (72).

8 Claims, 10 Drawing Figures

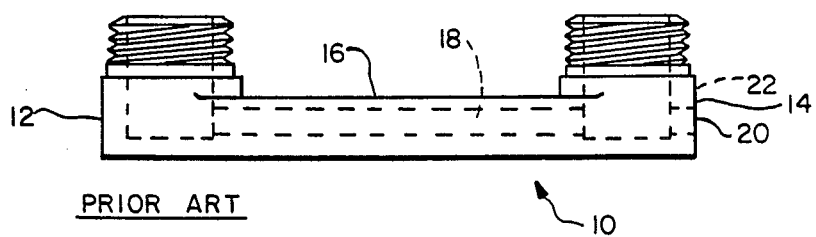
FIG.—1 PRIOR ART
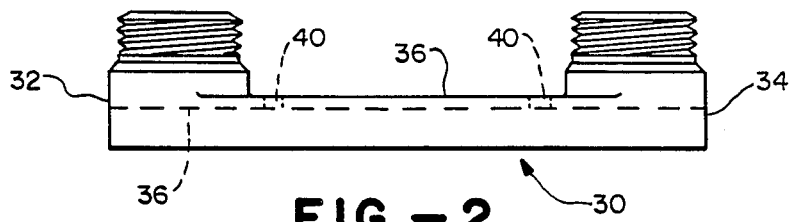
FIG.—2
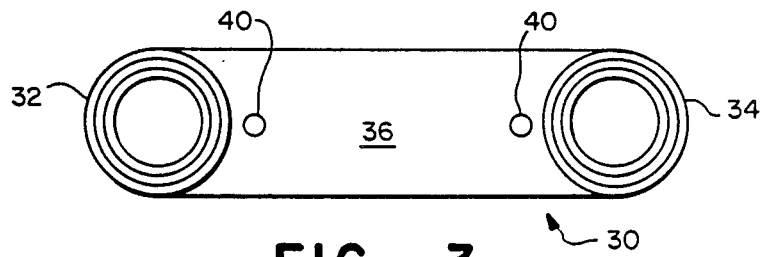
FIG.—3
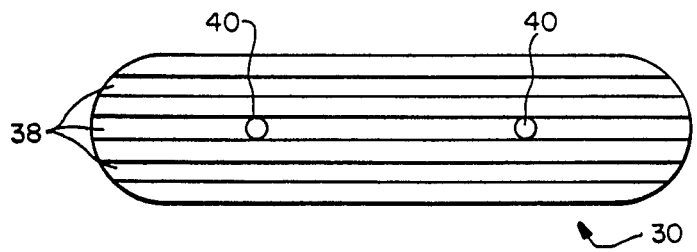
FIG.—4
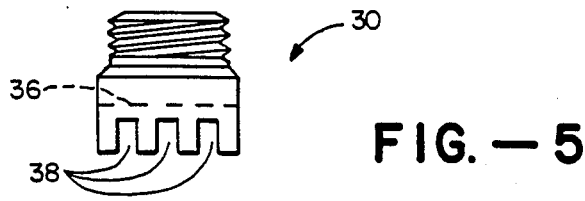
FIG.—5

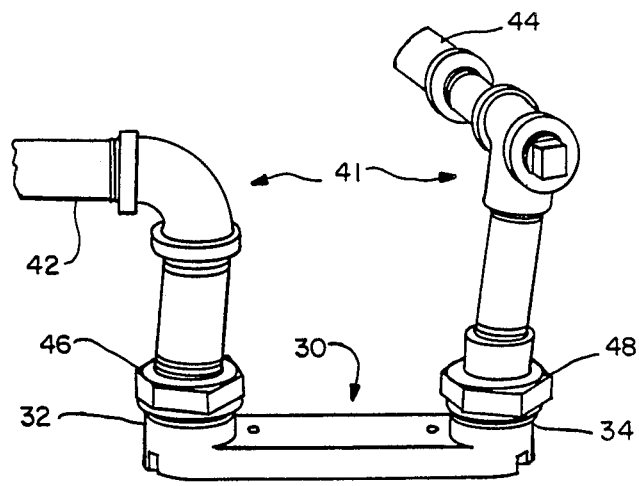
FIG.—6
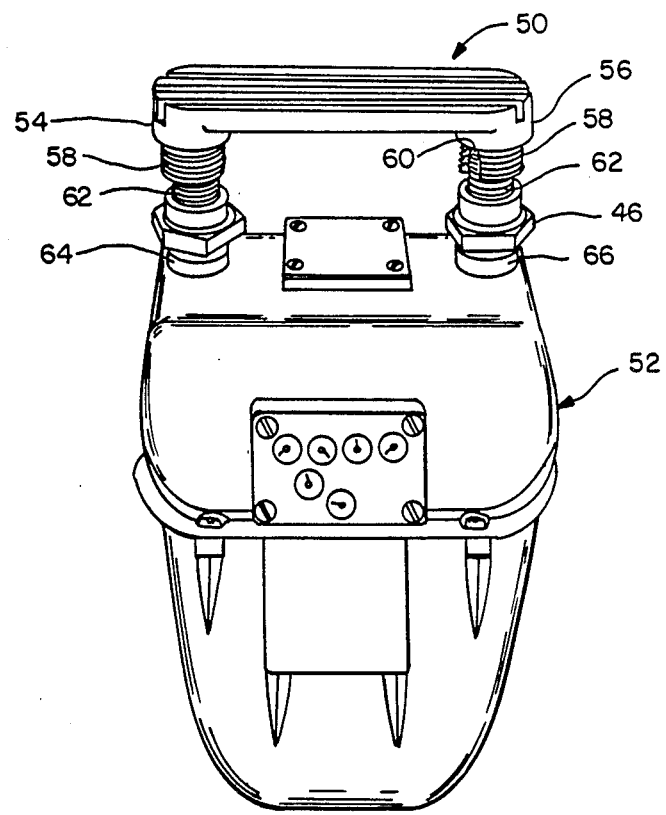
FIG.—7

4,711,470

1

UTILITY CONNECTION BAR

BACKGROUND OF THE INVENTION

1. Field of the Invention

This invention relates to an improved form of a bar used in utility connections before a utility meter is installed. More particularly, it relates to such a bar used in fluid, especially gas, installations as a plug between a fluid supply line and a customer line before installation of the utility meter for measuring a quantity of the fluid delivered to the customer. Most especially, it relates to such a bar that is configured to resist tampering to obtain unmetered fluid flow.

2. Description of the Prior Art

In natural gas installations, a gas supply line approaches a customer line with a gap dimensioned to receive a gas meter that extends between the supply line and the customer line and through which the natural gas flows for measurement as it is being delivered to the customer. In new installations, it is conventional practice to place a metal bar having fittings on each end between the supply line and the customer line until the customer is ready to have the gas turned on. At that time, the customer calls the gas utility, and service personnel replace the metal bar with the gas meter and open a valve or valves to begin delivery of the gas to the customer.

The conventional metal bars utilized in this manner have allowed individuals seeking to obtain natural gas without paying for it to steal the natural gas from the utility in the following manner. Such an individual will bore a channel between the fittings along the metal bar to provide an unmetered flow path between the supply line and the customer line when the metal bar is in place between the supply line and the customer line. The channel is drilled from one end of the metal bar, which is then filled at the end, so that the channel is not visible and the outside configuration of the metal bar is unchanged. With such a modified metal bar in place, the individual never calls the utility to have a gas meter installed and the gas turned on. Unless a service person happens to be standing next to the modified metal bar at the time gas is flowing, nothing seems amiss. Such diversion of natural gas is not detectable on the supply lines because there is a certain amount of loss in most supply lines due to underground leaks, which are repaired only when the leaks are unusually severe. Theft of natural gas in this manner causes significant financial losses for the utility, which are made up in the form of higher rates for honest customers.

SUMMARY OF THE INVENTION

Accordingly, it is an object of this invention to provide an improved utility connection bar which is configured to deter modification of the bar to allow flow of unmetered fluid through the utility connection bar.

It is a further object of the invention to provide such a utility connection bar which is configured so that modification of the bar to allow flow of unmetered fluid through the utility connection bar will alter the external configuration of the bar so that the modification will be noticeable to an observer.

It is a further object of the invention to provide such a utility connection bar which is also configured for use as a carrying handle for a fluid meter while bringing the fluid meter to a location for installation.

The attainment of these and related objects may be achieved through use of the novel utility connection bar herein disclosed. A utility connection bar in accordance with this invention has a plastic bar with threaded ends perpendicular to the plastic bar and extending upward from a top of the plastic bar. The plastic bar has a discontinuous bottom with a plurality of channels in the bottom. In one form of the invention, the plastic bar and threaded ends have the plurality of channels extending along a bottom of the plastic bar and the threaded ends. The utility connection bar in this form preferably also has first and second apertures extending from a top surface of the plastic bar at least to a depth of one of the channels. One of the first and second apertures is adjacent to each one of the threaded ends. The first and second apertures are positioned between the threaded ends. In another form of the invention, the pastic bar has the plurality of channels extending through the plastic bar from top to bottom between the treaded ends. Configuring the utility connection bar in this manner makes it very difficult to form a fluid flow path between the threaded ends without altering the external configuration of the connection bar.

The attainment of the foregoing and related objects should be more readily apparent to those skilled in the art, after review of the following more detailed description of the invention, taken together with the drawings, in which:

BRIEF DESCRIPTION OF THE DRAWINGS

FIG. 1 is a side view of a prior art utility connection bar.

FIG. 2 is a side view of a utility connection bar in accordance with the invention.

FIG. 3 is a top view of the utility connection bar of FIG. 2.

FIG. 4 is a bottom view of the utility connection bar of FIGS. 2-3.

FIG. 5 is an end view of the utility connection bar of FIGS. 2-4.

FIG. 6 is a perspective view of the utility connection bar of FIGS. 2-5 in a typical installation.

FIG. 7 is a front view of a utility meter with another form of a utility connection bar in accordance with the invention attached as a carrying handle.

DETAILED DESCRIPTION OF THE INVENTION

Figure 8:
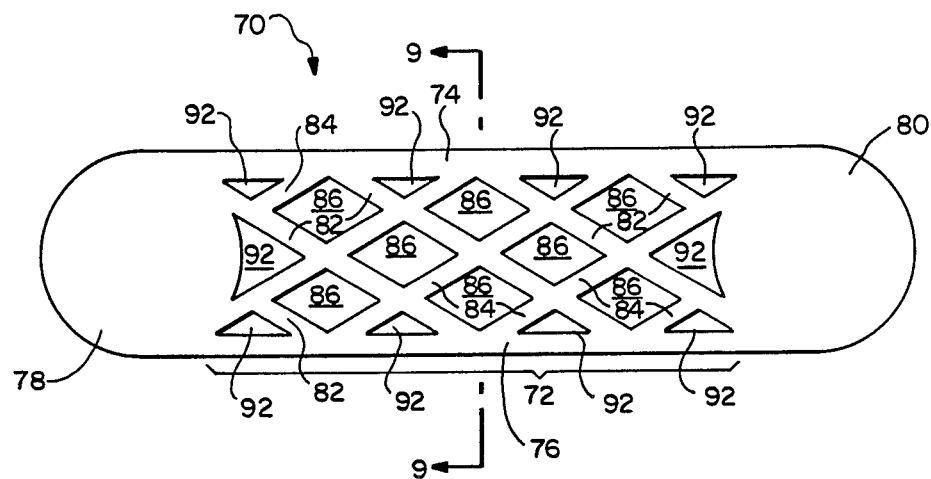
FIG. 8 is a bottom view of a third embodiment of a utility connection bar in accordance with the invention.

Turning now to the drawings, more particularly to FIG. 1, there is shown a prior art metal utility connection bar 10. The connection bar 10 has threaded ends 12 and 14 extending at right angles to a metal bar 16 extending between the ends 12 and 14. The metal bar 16 is dimensioned to position the threaded ends 12 and 14 opposite an end of a gas supply line and an end of a customer gas line, respectively. In use of the connection bar 10, the ends 12 and 14 are fastened to the ends of the gas supply line and the customer gas line by fittings to seal those ends. When a gas meter is installed, the connection bar 10 is removed.

In order to steal gas, a customer can bore a passage 18 from end 14 at 20 through the metal bar 16 to the end 12, thus creating a flow path for unmetered gas from the gas supply line through the connection bar 10 to the customer gas line. After boring the passage 18, the customer seals up the passage at 20 beyond inside 22 of the end 14. Once the passage 18 has been sealed at 20, the passage 18 does not alter the external configuration of the connection bar 10, thus making detection of the passage 18 very difficult. This modification of the metal connection bar 10 may allow theft of gas from the utility to go undetected for long periods of time.

FIGS. 2-5 show a utility connection bar 30 in accordance with the invention, which is substituted for the metal connection bar 10 between the gas supply line and the customer gas line. The connection bar 30 is molded from a suitable plastic, such as polystyrene, vinyl chloride, or the like. The connection bar 30 has threaded ends 32 and 34 perpendicular to a plastic bar 36 extending between the ends 32 and 34. As in the connection bar 10, the plastic bar 36 has a length chosen to position the ends 32 and 34 opposite to ends of a gas supply line and a customer gas line, respectively. The plastic bar 36 and the ends 32 and 34 have a plurality of channels 38 which extend the length of the connection bar. A pair of ¼ inch diameter holes 40 extend through the plastic bar 36 near the threaded ends 32 and 34. The combination of the channels 38 and the holes 40 makes it very difficult to form a gas flow path between the threaded ends 32 and 34 without altering the external appearance of the connection bar 30.

FIG. 6 shows how the utility connection bar 30 is connected at gas connection 41 between gas supply line 42 and customer gas line 44. The threaded ends 32 and 34 are attached to the lines 42 and 44 by conventional fittings 46 and 48. As shown, the connection utility bar 30 is dimensioned to fit between the gas supply line 42 and the customer gas line 44 of the conventional gas connection 41.

FIG. 7 shows a modified form of a utility connection bar 50 that will also function as an improved handle for carrying meter 52 to a gas connection 41 (FIG. 6). Threaded ends 54 and 56 on the connection bar 50 have both external threads 58 and internal threads 60. The external threads 58 are used to attach the threaded ends 54 and 56 of the connection bar 50 between the gas supply line 42 and the customer gas line 44 in the same manner as the connection bar 30 (FIG. 6). For use as a handle, externally threaded studs 62 are attached to the internal threads 60 in the ends 54 and 56. Fittings 46 are threaded between the other end of the threaded studs 62 and inlet 64 and outlet 66 of the gas meter 52. Using the connection bar 50 as a handle in this manner adds only about 1.5 pounds to the weight of the meter 52 and allows it to be carried conveniently. At the gas connection 41, the fittings 46 are used to attach the meter 52 to the gas supply line 42 and the customer gas line 44 in place of the connection bar 30 or 50. Other than as shown and described, the construction and use of the connection bar 50 is the same as that of the connection bar 30.

Figure 9:
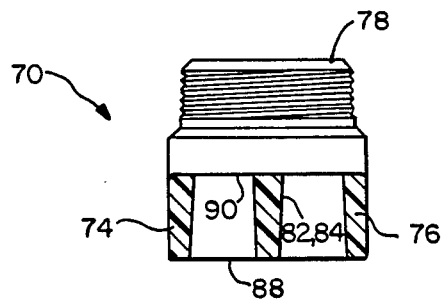
FIG. 9 is a cross-section view taken along the line 9—9 in FIG. 8.
Figure 10:
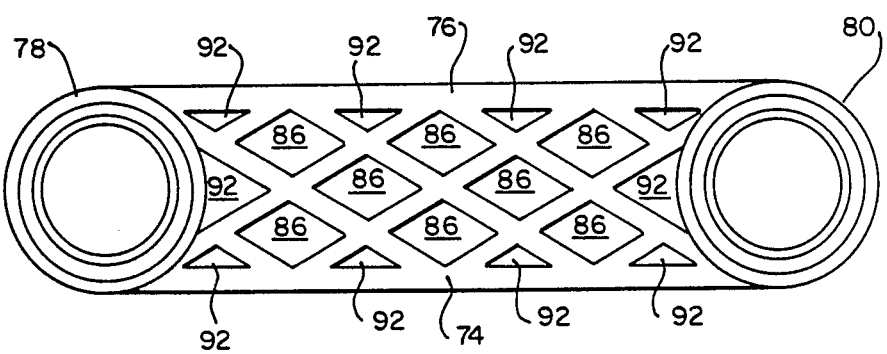
FIG. 10 is a top view of the utility connection bar of FIGS. 8-9.

A utility connection bar 70, as shown in FIGS. 8-10, has increased strength and difficulty of modification to steal gas compared to the FIGS. 1-7 embodiments. In the utility connection bar 70, plastic bar 72 is formed from side strips 74 and 76 extending straight between ends 78 and 80, a first set of strips 82 extending at a 30° angle with respect to the strips 74 and 76, and a second set of strips 84 at an equal and opposite 30° angle with respect to the strips 74 and 76. The strips 82 and 84 form diamond-shaped channels 86 extending from bottom 88 to top 90 of the plastic bar 72. Similar triangular shaped channels 92 are formed by the strips 74, 76, 82 and 84 and ends 78 and 80. The utility connection bar 70 is preferably molded from a Nylon Zytel 105 plastic, obtainable from E. I. DuPont de Nemours and Company, Wilmington, Del. Other than as shown and described, the construction and operation of the utility connection bar 70 is the same as that of the utility connection bar 30.

It should now be readily apparent to those skilled in the art that a novel utility connection bar capable of achieving the stated objects of the invention has been provided. This utility connection bar deters modification to allow unmetered fluid flow through the bar by being configured so that modification to provide a flow path would require change in the external configuration of the connection bar. The utility connection bar may also be used to provide a relatively light weight handle for carrying a utility meter to a utility connection for installation.

It should further be apparent to those skilled in the art that various changes in form and details of the invention as shown and described may be made. It is intended that such changes be included within the spirit and scope of the claims appended hereto.

What is claimed is:

1. A utility connection bar, which comprises a plastic bar, threaded ends perpendicular to said plastic bar and extending upward from a top of said bar, said plastic bar having a discontinous bottom with a plurality of channels in the bottom.

2. The utility connection bar of claim 1 in which said plastic bar and threaded ends have the plurality of channels extending along the bottom of said plastic bar and threaded ends.

3. The utility connection bar of claim 2 additionally comprising first and second apertures extending from a top surface of said plastic bar at least to a depth of one of said channels, one of said first and second apertures being adjacent to each one of said threaded ends, said first and second apertures being positioned between said threaded ends.

4. The utility connection bar of claim 1 in which said threaded ends have both internal and external threads.

5. A handle for a utility connection meter, which comprises the utility connection bar of claim 4, a first stud threaded to the internal threads of one of said threaded ends, a second stud threaded to the internal threads of another of said threaded ends, and a pair of fittings connected to said first and second studs for attaching said studs to a utility meter.

6. The utility connection bar of claim 1 in which said channels extend vertically between the bottom and the top of said plastic bar between said threaded ends.

7. The utility connection bar of claim 6 in which said vertically extending channels are formed by a plurality of strips comprising said plastic bar, at least some of said plurality of strips being at equal and opposite diagonal angles relative to said threaded ends.

8. The utility connection bar of claim 6 in which said plurality of strips include first and second side strips extending directly between said threaded ends.

* * * * *